(12) United States Patent
Pai et al.

(10) Patent No.: US 8,041,083 B2
(45) Date of Patent: Oct. 18, 2011

(54) FINGERPRINT SENSING CIRCUIT

(75) Inventors: Hung-Chuan Pai, Irvine, CA (US); Shou-Fang Chen, Hsinchu Hsien (TW); Chao-Tung Yang, Tainan (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 721 days.

(21) Appl. No.: 12/143,067

(22) Filed: Jun. 20, 2008

(65) Prior Publication Data

US 2008/0317300 A1    Dec. 25, 2008

(30) Foreign Application Priority Data

Jun. 22, 2007 (TW) ............................... 96122635 A

(51) Int. Cl.
*G06K 9/00* (2006.01)
(52) U.S. Cl. .................. 382/124; 324/672; 324/679
(58) Field of Classification Search .................. 382/115, 382/124, 125, 126, 127; 340/5.82; 383/356
See application file for complete search history.

(56) References Cited

U.S. PATENT DOCUMENTS

| | | | |
|---|---|---|---|
| 4,210,899 A | 7/1980 | Swonger et al. | |
| 4,525,859 A | 6/1985 | Bowles et al. | |
| 5,963,679 A * | 10/1999 | Setlak | ............ 382/312 |
| 6,259,804 B1 | 7/2001 | Setlak et al. | |
| 2006/0034493 A1* | 2/2006 | Shimamura et al. | .......... 382/115 |

* cited by examiner

*Primary Examiner* — Jason M Repko
*Assistant Examiner* — Siamak Harandi
(74) *Attorney, Agent, or Firm* — Edell, Shapiro & Finnan, LLC

(57) ABSTRACT

A fingerprint sensing circuit for detecting a fingerprint of a user, including a signal source, at least a sensing unit, a resistor, an electrode, and a detecting circuit. The signal source provides a reference signal. The electrode is coupled to a reference level. The sensing unit generates a sensed value according to the electrode and the fingerprint of the user. The resistor is coupled between the signal source and the output node. The detecting circuit is coupled to the output node. The resistor, the sensing unit, and the electrode constitute a filter circuit to the signal source. At least a first signal is generated to the output node according to the reference signal and the sensed value, and the detecting circuit detects the first signal to generate a corresponding detected result indicative of the fingerprint.

12 Claims, 13 Drawing Sheets

US 8,041,083 B2

FINGERPRINT SENSING CIRCUIT

FIELD OF THE INVENTION

The present invention relates to a fingerprint sensing circuit.

DESCRIPTION OF THE PRIOR ART

At present, fingerprint recognition technology has become a common security mechanism, and therefore more and more fingerprint sensing circuits are proposed. For example, U.S. Pat. Nos. 4,210,899 and 4,525,859 provide methods for capturing fingerprints through optical scanning and video camera respectively. However, optical-based recognition methods may not work well if optical sensing devices are defaced and damaged, and may also be cheated by using pictures or patterns which have correct fingerprints thereon. In addition, U.S. Pat. No. 6,259,804 provides a method based on electric field for fingerprint sensing. In FIG. 12 of that patent, the sensed signal generated by the sensing electrode 78 is amplified by the amplifier 73, and the amplified signal is an AC analog signal which is then converted into a digital signal by an analog-to-digital converter (A/D) 180. The AC analog signal relates to the frequency of the signal source (not shown); the higher the frequency of the signal source, the higher the frequency of the AC analog signal appears. Thus, to cover an extended application range, the A/D 180 requires faster processing capability, leading to higher circuit implementation cost. On the other hand, if the processing capability of the A/D 180 is not enhanced, the application of the fingerprint sensing circuit will be limited.

SUMMARY

It is therefore an objective of the claimed invention to provide a fingerprint sensing circuit for sensing a fingerprint of a user. The fingerprint sensing circuit utilizes a low-pass or high-pass filter as part of the sensing circuitry and detects a peak value or an average energy value of the output of the low-pass or high-pass filter to generate a DC result; this DC result is further converted into a digital signal by an analog-to-digital (A/D) converter. Because the A/D converter in this application processes DC analog signals instead of AC analog signals, the power consumption is lowered, the circuit complexity is reduced, and Nyquist sampling requirement is relieved. Furthermore, the sensing circuit does not need to sacrifice the application frequency range of the signal source for the limited sampling capability of the A/D converter, and therefore possesses a wider application scope.

According to an embodiment of the claimed invention, a fingerprint sensing circuit for sensing a fingerprint of a user is disclosed. The fingerprint sensing circuit comprises a signal source, at least a sensing unit, a resistor, an electrode, and a detecting circuit. The signal source is for providing a reference signal. The electrode is coupled to a reference level. The sensing unit, which is coupled to an output node, is for generating at least a sensed value according to the electrode and the fingerprint of the user. The resistor is coupled between the signal source and the output node. The detecting circuit is coupled to the output node. The resistor, the sensing unit, and the electrode constitute a low-pass filter circuit to the signal source. At least a first signal is generated at the output node according to the reference signal and the sensed value. The detecting circuit detects the first signal to generate a corresponded detected result which indicates the fingerprint of the user.

According to another embodiment of the claimed invention, a fingerprint sensing circuit for sensing a fingerprint of a user is disclosed. The fingerprint sensing circuit comprises a signal source, at least a sensing unit, a resistor, an electrode, and a detecting circuit. The signal source is for providing a reference signal. The electrode is coupled to the signal source. The sensing unit, which is coupled to an output node, is for generating a sensed value according to the electrode and the fingerprint of the user. The resistor is coupled between the output node and a reference level. The detecting circuit is coupled to the output node. The resistor, the sensing unit, and the electrode constitute a high-pass filter circuit to the signal source. At least a first signals is generated at the output node according to the reference signal and the sensed value, and the detecting circuit detects the first signal to generate a corresponded detected result which indicates the fingerprint of the user.

The fingerprint sensing circuit is less constrained by the frequency of the signal source, and the AD converter does not process high frequency AC analog signals related to the signal source because the AD converter now processes DC analog signals. In summary, the fingerprint sensing circuit of the present invention can yield more accurate sensing results, and the circuit configuration has advantages of simplicity, easy implementation, less power consumption, and low cost. Furthermore, the limitation on the frequency of the signal source is also relieved as there is no Nyquist constraint to sample a DC value, and therefore the application scope is extended.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
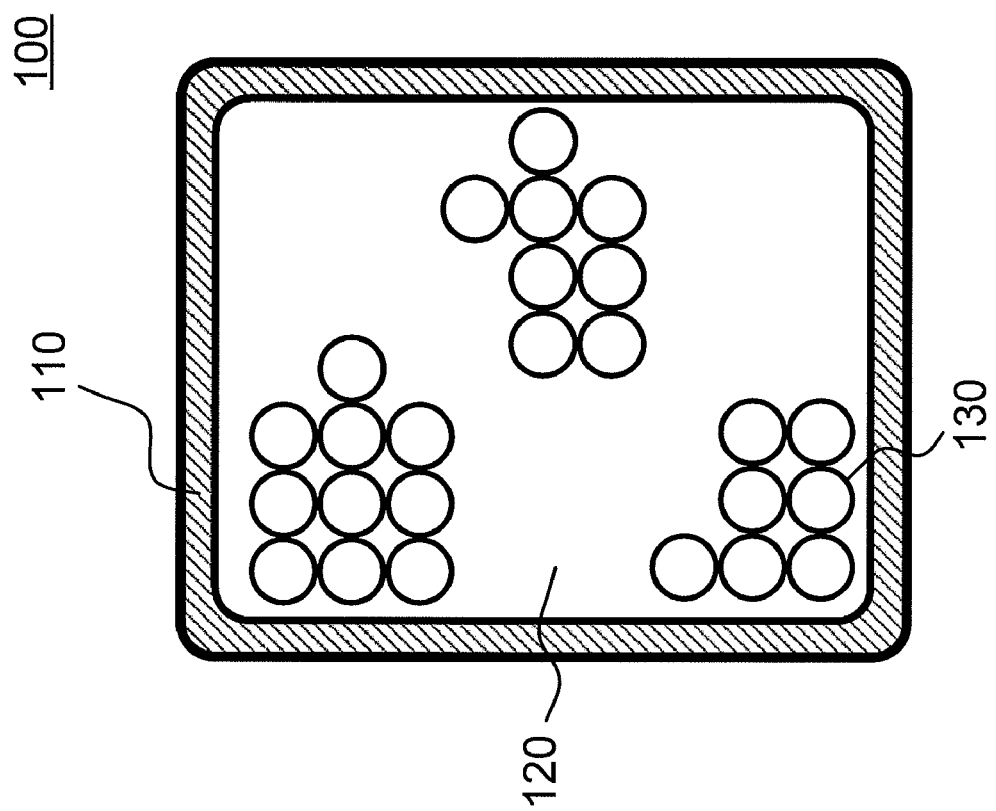
FIG. 1A shows the outward appearance of a fingerprint sensing circuit according to an embodiment of the invention.
Figure 1B:
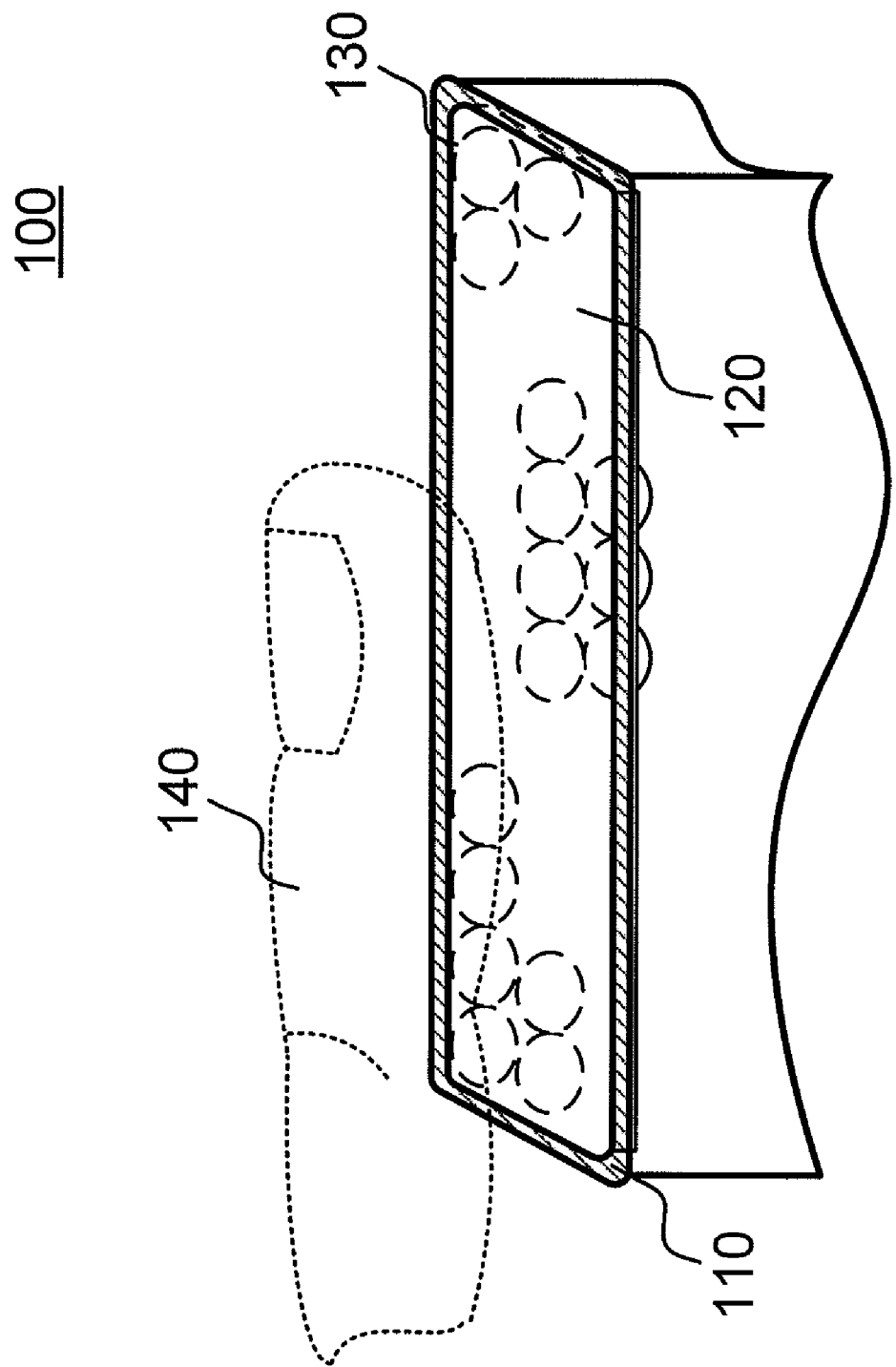
FIG. 1B shows the relative position between a finger of a user and the fingerprint sensing circuit 100.

FIG. 1A shows the outward appearance of a fingerprint sensing circuit according to an embodiment of the invention. The fingerprint sensing circuit 100 includes an external electrode 110 that surrounds an inner part, and the inner part includes a cover layer 120 for protecting a plurality of sensing units 130 that are allocated under the cover layer 120. FIG. 1B shows the relative positions of the fingerprint sensing circuit 100 and a user's finger 140. During a sensing process, the finger 140 is placed onto the external electrode 110 and the cover layer 120 to contact them simultaneously. The sensing units 130 are allocated under the cover layer 120. Dielectric may be one of the possible materials for the cover layer 120.

Figure 2:
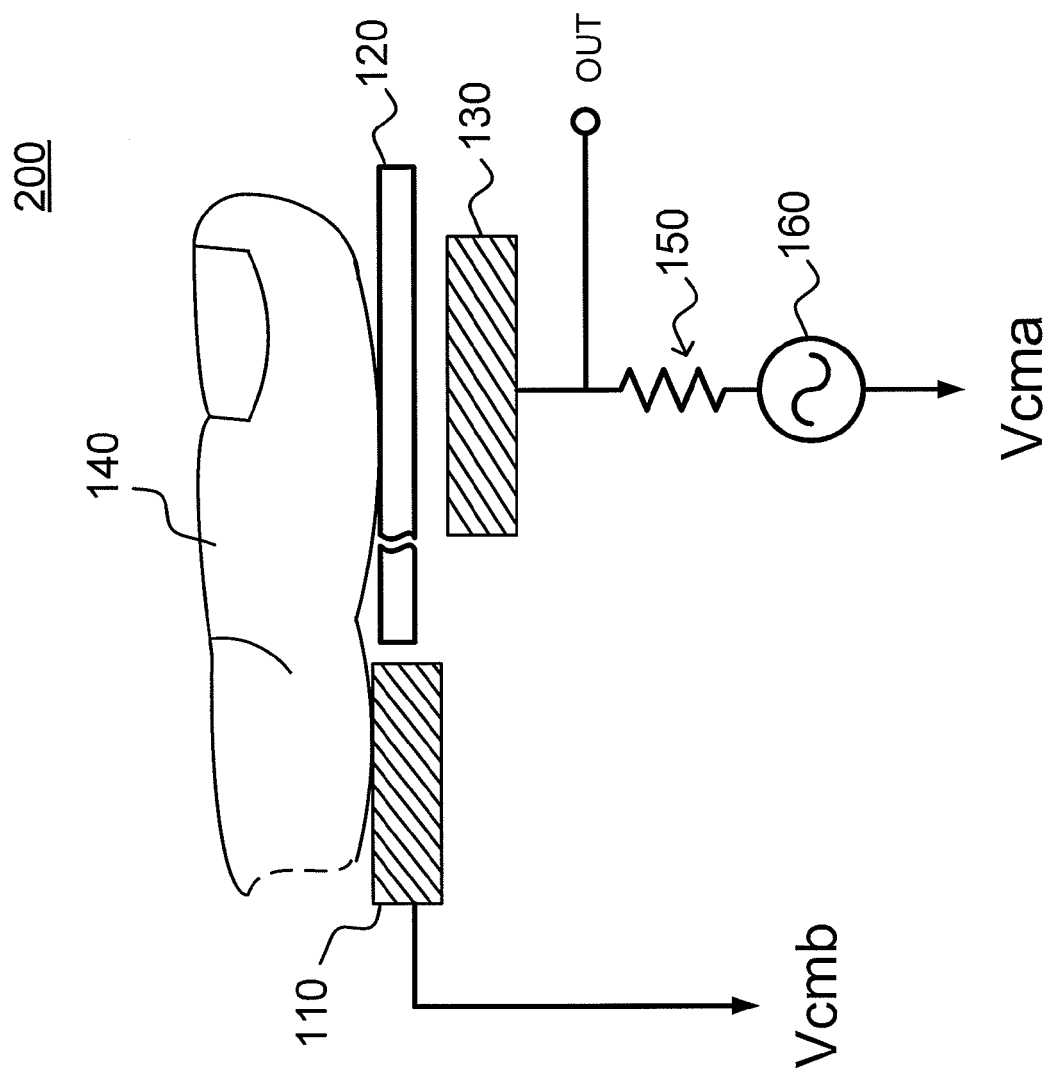
FIG. 2 shows a fingerprint sensing circuit according to a first embodiment of the claimed invention.
Figure 3:
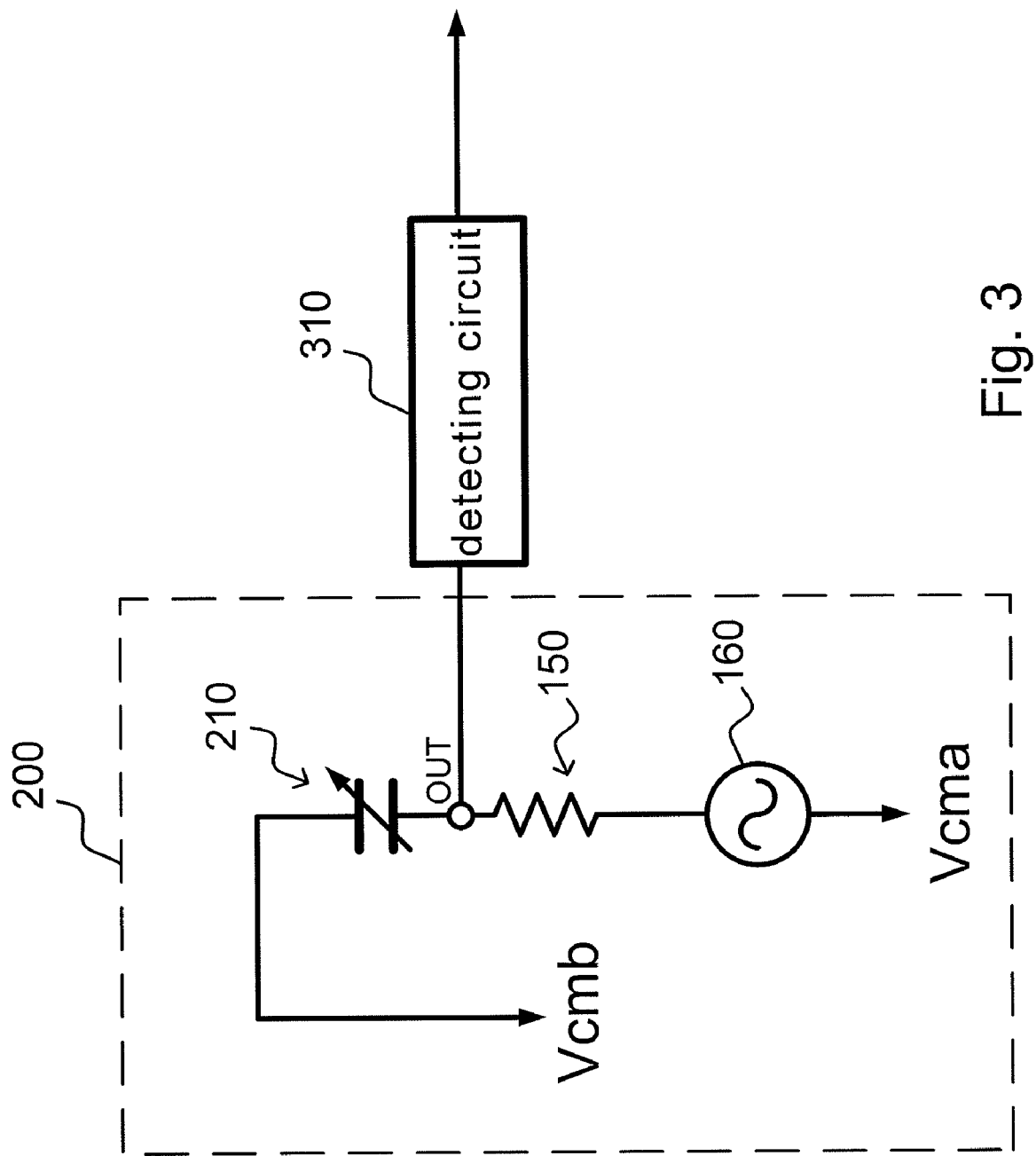
FIG. 3 shows the equivalent circuit of a fingerprint sensing circuit according to a first embodiment of the invention.

FIG. 2 shows a fingerprint sensing circuit according to a first embodiment of the invention. The fingerprint sensing circuit 200 comprises the external electrode 110, the cover layer 120, a plurality of sensing units 130 (only one is shown for explanation), a resistor 150, and a signal source 160. The external electrode 110 and the signal source 160 are respectively coupled to the reference levels Vcmb and Vcma. Practically, Vcma and Vcmb may or may not be the same DC voltage level. The cover layer 120 covers the sensing unit 130. The sensing unit 130 is coupled to the signal source 160 through the resistor 150, and the fingerprint sensing circuit 100 further comprises an output node OUT coupled between the sensing unit 130 and the resistor 150. The signal source 160 is for providing a reference signal, such as an AC sinusoidal wave signal with a frequency range from 1 KHz to 1 MHz. The finger 140 contacts the external electrode 110 and the cover layer 120 and covers many sensing units 130. Actually, each sensing unit 130 is composed of an electrode for generating a sensed value by sensing the fingerprint. More specifically, each sensing unit 130 and a corresponding local fingerprint pattern of the finger 140 that the sensing unit 130 faces constitute an equivalent capacitor with a specific capacitance, and the sensed value of a sensing unit 130 is the capacitance of the corresponding equivalent capacitor. One electrode of the equivalent capacitor is formed by the sensing unit 130 and the other electrode is formed equivalently by the surface of the finger 140 together with the external electrode 110. The cover layer 120 forms the dielectric layer of the equivalent capacitor. FIG. 3 shows the corresponding equivalent circuit, wherein the output node OUT is further coupled to a detecting circuit 310.

As shown in FIG. 3, the capacitor 210 of the fingerprint sensing circuit 200 is the above-mentioned equivalent capacitor, and is represented by a variable capacitor because its capacitance varies with different local fingerprint patterns of the finger 140. The resistor 150 and the capacitor 210 constitute a low-pass filter circuit to the signal source 160, and therefore different first signals will be generated at the output node OUT according to the reference signal of the signal source 160, the resistance of the resistor 150 and different capacitances of the capacitor 210. Then, the detecting circuit 310 detects the first signal to generate a detected result which is utilized as a representation of the user's fingerprint. In practice, the detecting circuit may detect a peak value or an average energy value of the first signal to generate the detected result. Therefore, the detected result is a DC analog signal.

Figure 4:
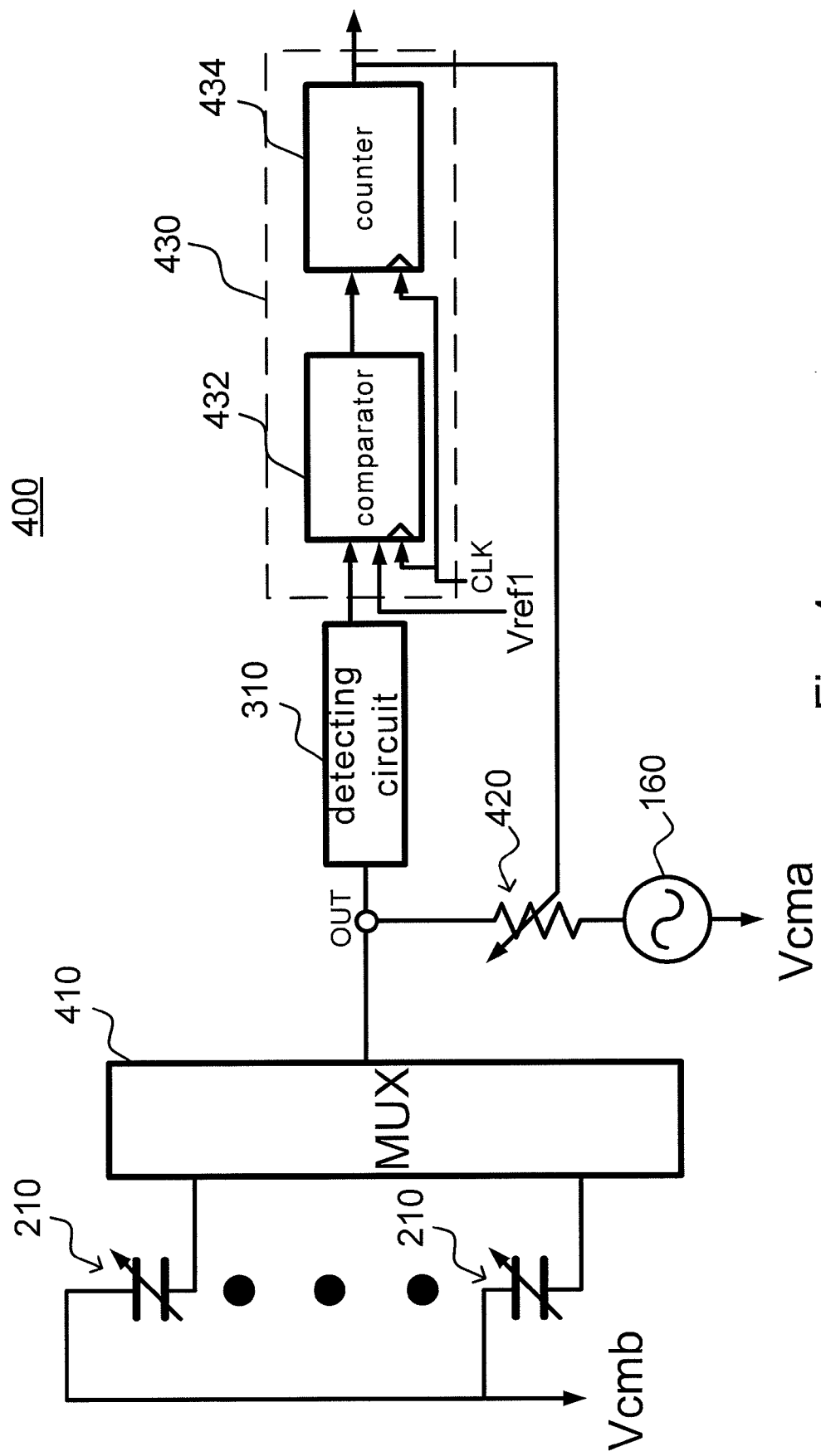
FIG. 4 shows details of a circuit configuration of a fingerprint sensing circuit according to the first embodiment of the invention.

FIG. 4 shows a circuit configuration of a fingerprint sensing circuit according to the first embodiment of the invention. The fingerprint sensing circuit 400 comprises a plurality of capacitors 210, a multiplexer (MUX) 410, the signal source 160, a variable resistor 420, the detecting circuit 310, and an analog-to-digital (A/D) converter 430. As mentioned above, the sensing unit 130, the finger 140, and the external electrode 110 equivalently form a capacitor 210. With respect to different local fingerprint patterns, each capacitor 210 has a specific capacitance, corresponding to the sensed value of the sensing unit 130. The MUX 410 is coupled to the capacitors 210 and is used for selecting one of the capacitors 210. The selected capacitor 210 and the variable resistor 420 form a filter circuit. The detecting circuit 310 detects a peak value or an average energy value of the first signal outputted from the output node OUT, and outputs a DC analog signal (the detected result) to the A/D 430. In practice, the selected capacitor 210 and the variable resistor 420 form a low-pass filter circuit to the signal source 160, and the first signal outputted from the output node OUT is the low-pass filtered result of the reference signal. Because the A/D 430 processes a DC analog signal instead of an AC analog signal, a simplified and low cost A/D is sufficient for this implementation. Of course, a conventional AD is also suitable for this implementation.

Figure 5:
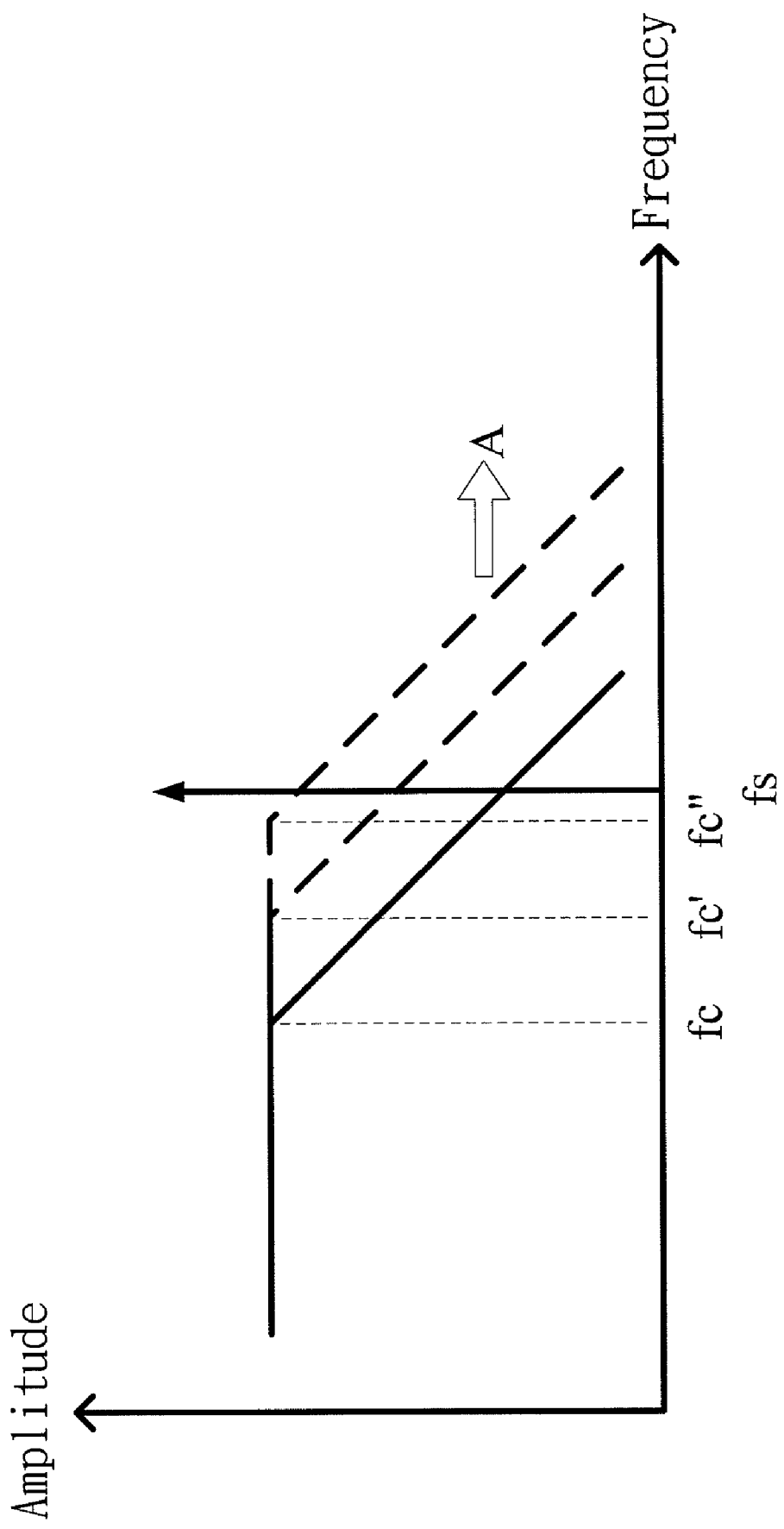
FIG. 5 shows the relation between the frequency response of the low-pass filter and the reference signal in the frequency domain.

Those skilled in the art know that the cut-off frequency of the low-pass filter is $fc=1/(2\pi RC)$, where R is the resistance of the variable resistor 420, and C is the capacitance of the capacitor 210. FIG. 5 shows the relation between the frequency response of the low-pass filter and the reference signal in the frequency domain. The frequency of the reference signal is fs, and the initial cut-off frequency of the low-pass filter is fc. As the resistance R decreases, the cut-off frequency moves gradually towards the direction A and becomes fc' and then fc''. Therefore, the amplitude of the low-pass filtered result of the reference signal increases gradually, and the DC level of the detected result outputted from the detecting circuit 310 becomes higher accordingly. The comparator 432 compares the detected result with a reference value Vref1 to generate an indication signal, and the indication signal controls the counter 434 to increase or decrease the value of the digital signal generated by the counter 434. The digital signal controls the variable resistor 420 to change the resistance. For example, when the detected result is less than the reference value Vref1, the comparator 432 generates a "downward" indication signal which controls the counter 434 to decrease the value of the digital signal, and the resistance of the variable resistor 420 decreases under the control of the digital signal. More specifically, if the digital signal is a 4-bit signal, there are 16 available resistance values of the variable resistor 420 corresponding respectively to 16 values of the 4-bit digital signal. Hence, as shown in FIG. 5, when the resistance of the variable resistor 420 decreases, the frequency response of the low-pass filter moves towards the direction A and the cut-off frequency moves from fc to fc', resulting in the increase of the peak value of the first signal at the output node OUT. Therefore, the DC level of the detected result of the detecting circuit 310 increases. Then, the comparator 432 generates a new indication signal according to the new detected result (with a higher DC level) and the reference value Vref1. The procedure will be repeated constantly until the detected result is greater than the reference value Vref1. At this time, the digital signal outputted by the counter 434 will correspond to the capacitance of the selected capacitor 210. Next, the MUX 410 selects other capacitors 210 and at the same time the detecting circuit 310 is reset for detecting a newly generated first signal, and the procedure is repeated until all the capacitors 210 are analyzed.

Figure 6:
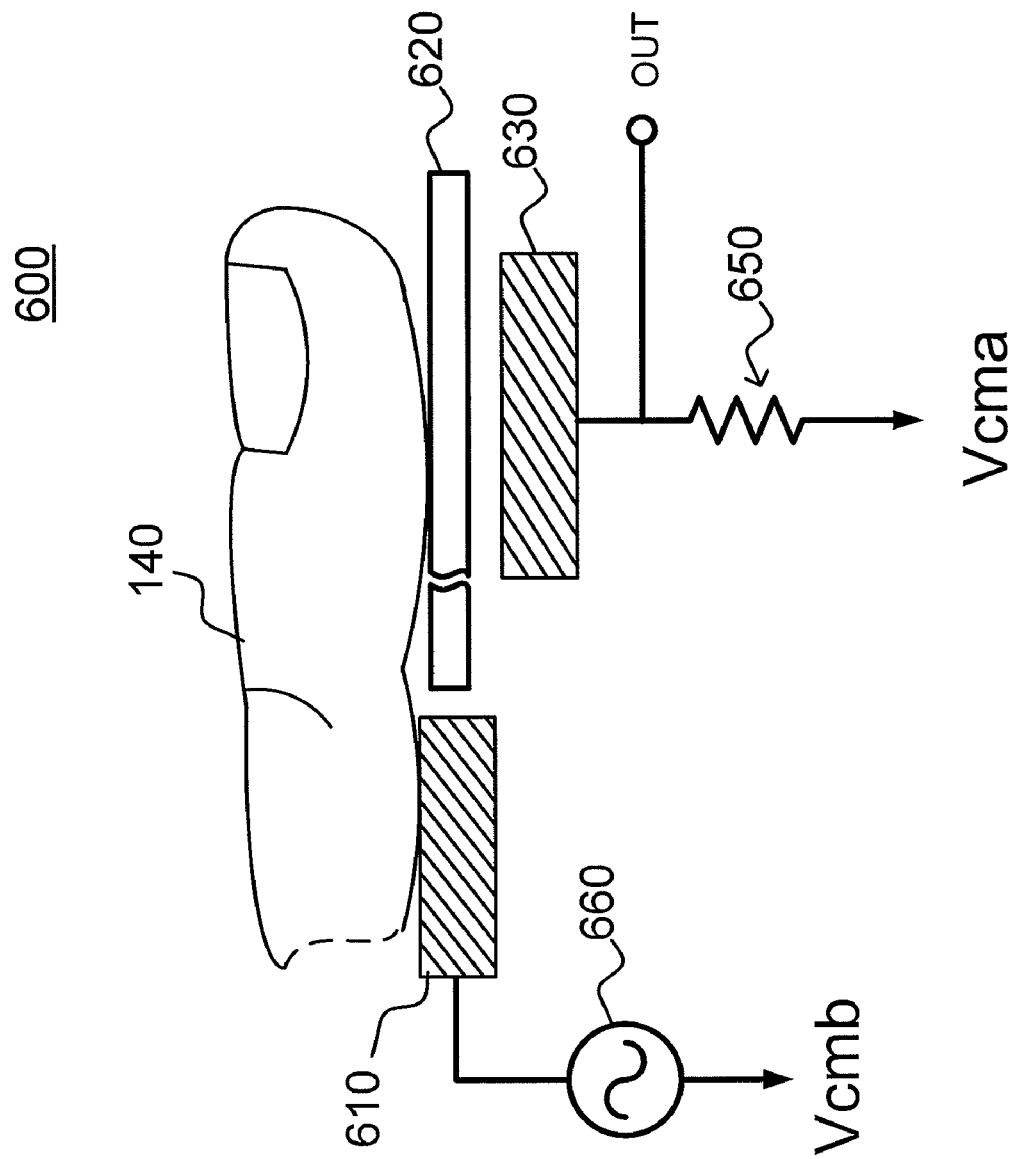
FIG. 6 shows a fingerprint sensing circuit according to a second embodiment of the invention.
Figure 7:
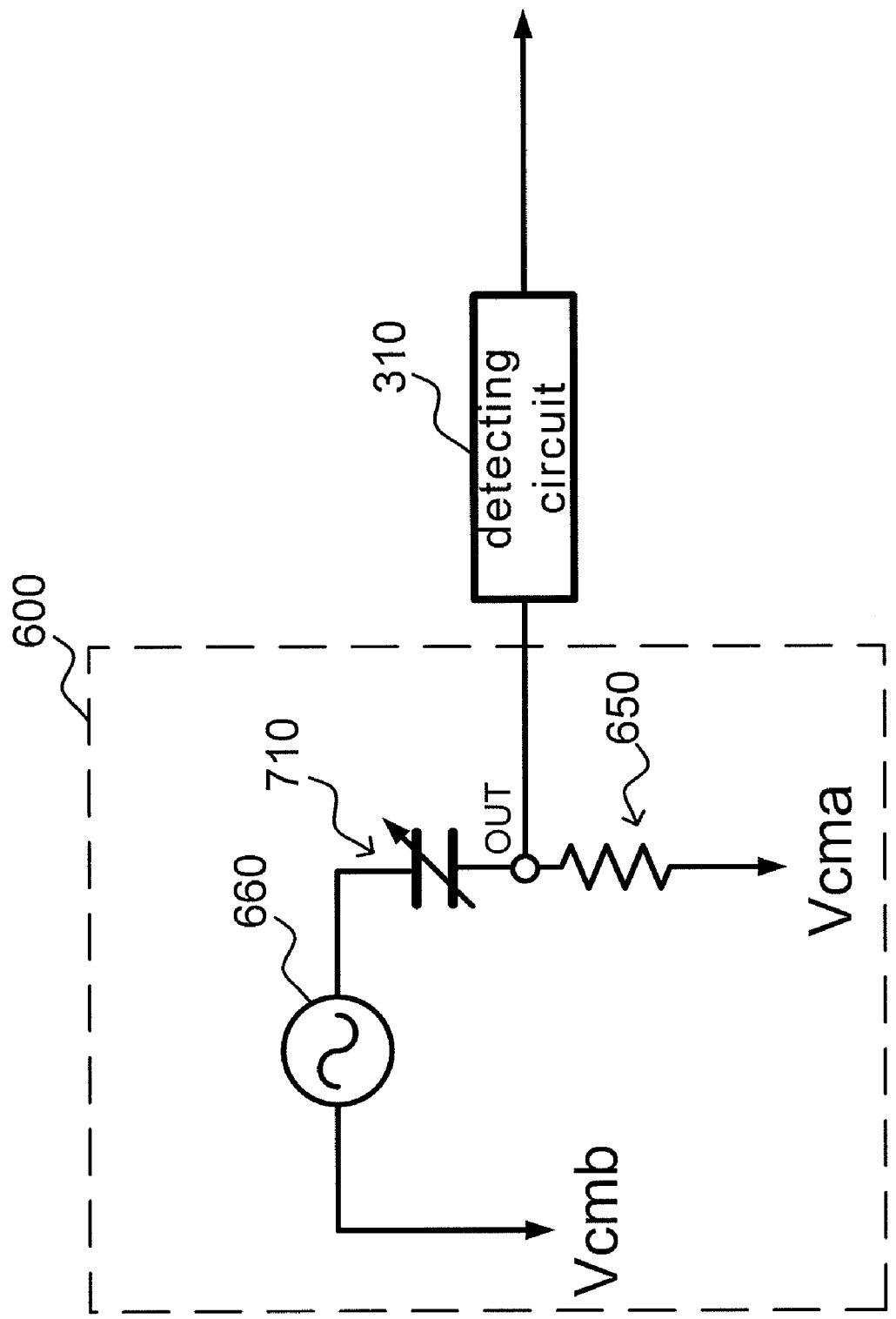
FIG. 7 shows the equivalent circuit of a fingerprint sensing circuit according to the second embodiment of the invention.

FIG. 6 shows a fingerprint sensing circuit according to a second embodiment of the invention. Similarly, only one sensing unit is shown for explanation. The sensing mechanism is similar to the first embodiment, but now the circuit configuration is slightly different. The external electrode 610 of the fingerprint sensing circuit 600 is coupled to the signal source 660, and the signal source 660 is coupled to the reference level Vcmb. The cover layer 620 covers the sensing unit 630. The sensing unit 630, which is an electrode, is coupled to the resistor 650, and the resistor 650 is coupled to another reference level Vcma. In practice, Vcma and Vcmb may or may not be the same DC voltage level. An output node OUT is coupled between the sensing unit 630 and the resistor 650. The elements shown in FIG. 6 can be illustrated by the equivalent circuit shown in FIG. 7, wherein the output node OUT is further coupled to the detecting circuit 310. The detecting circuit 310 detects, for example, a peak value or an average energy value of the first signal and generates a DC detected result. However, unlike the low-pass filter in the first embodiment, in the second embodiment, the capacitor 710 and the resistor 650 constitute a high-pass filter to the signal source 660.

Figure 8:
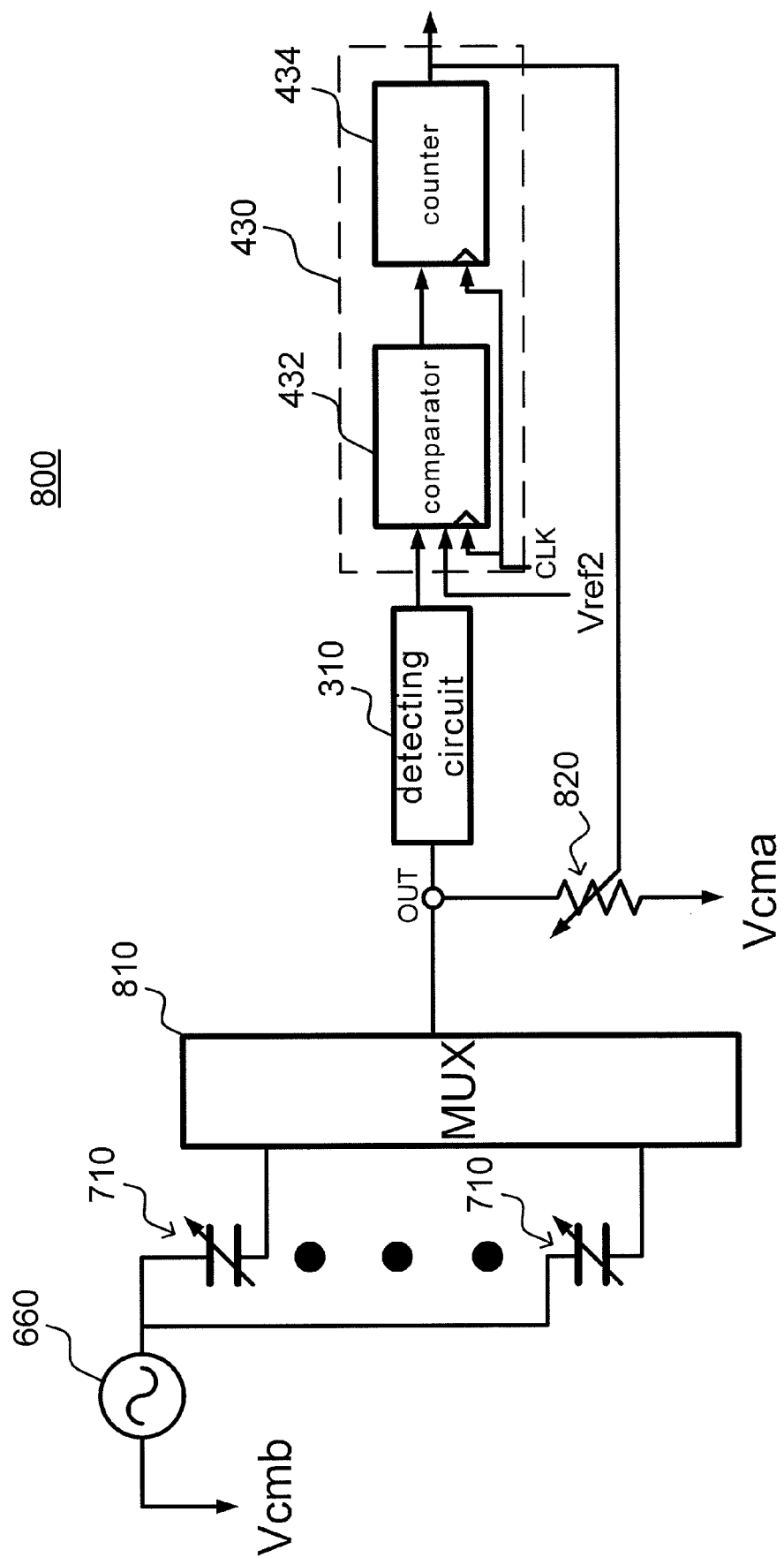
FIG. 8 shows details of a circuit configuration of a fingerprint sensing circuit according to the second embodiment of the invention.
Figure 9:
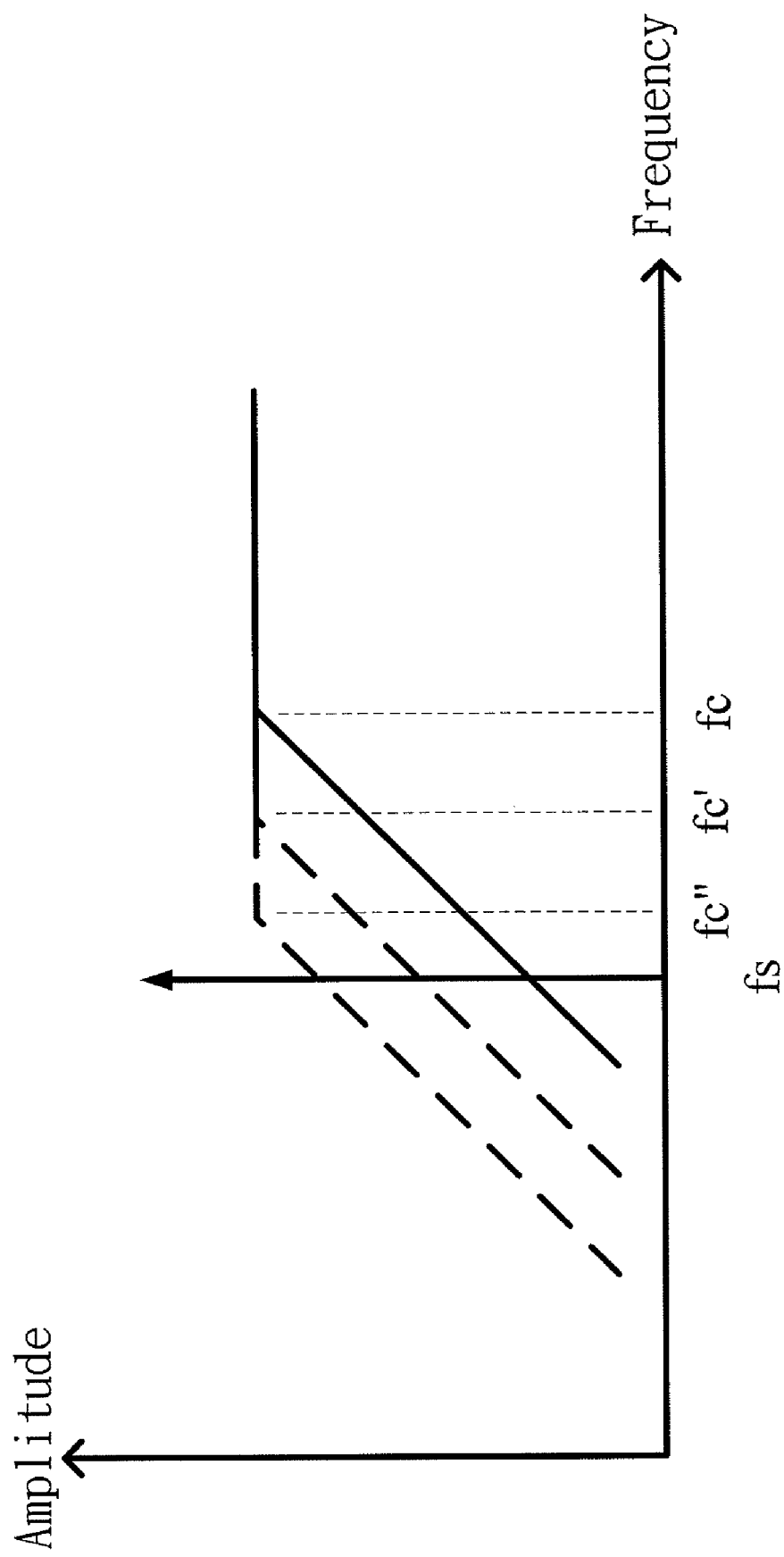
FIG. 9 shows the relation between the frequency response of the high-pass filter and the reference signal in the frequency domain.

FIG. 8 shows the detailed circuit configuration of a fingerprint sensing circuit according to the second embodiment of the claimed invention. The multiplexer (MUX) 810 of the fingerprint sensing circuit 800 is coupled to a plurality of capacitors 710 and is for selecting one of the capacitors 710. The selected capacitor 710 and the variable resistor 820 form a high-pass filter circuit to the signal source 660. FIG. 9 shows the relation between the frequency response of the high-pass filter and the reference signal in frequency domain. Similarly, the comparator 432 compares the detected result with a reference value Vref2 to generate an indication signal, and the indication signal controls the counter 434 to increase or decrease the value of the digital signal, which in turn controls the variable resistor 820 to change its resistance.

Figure 10:
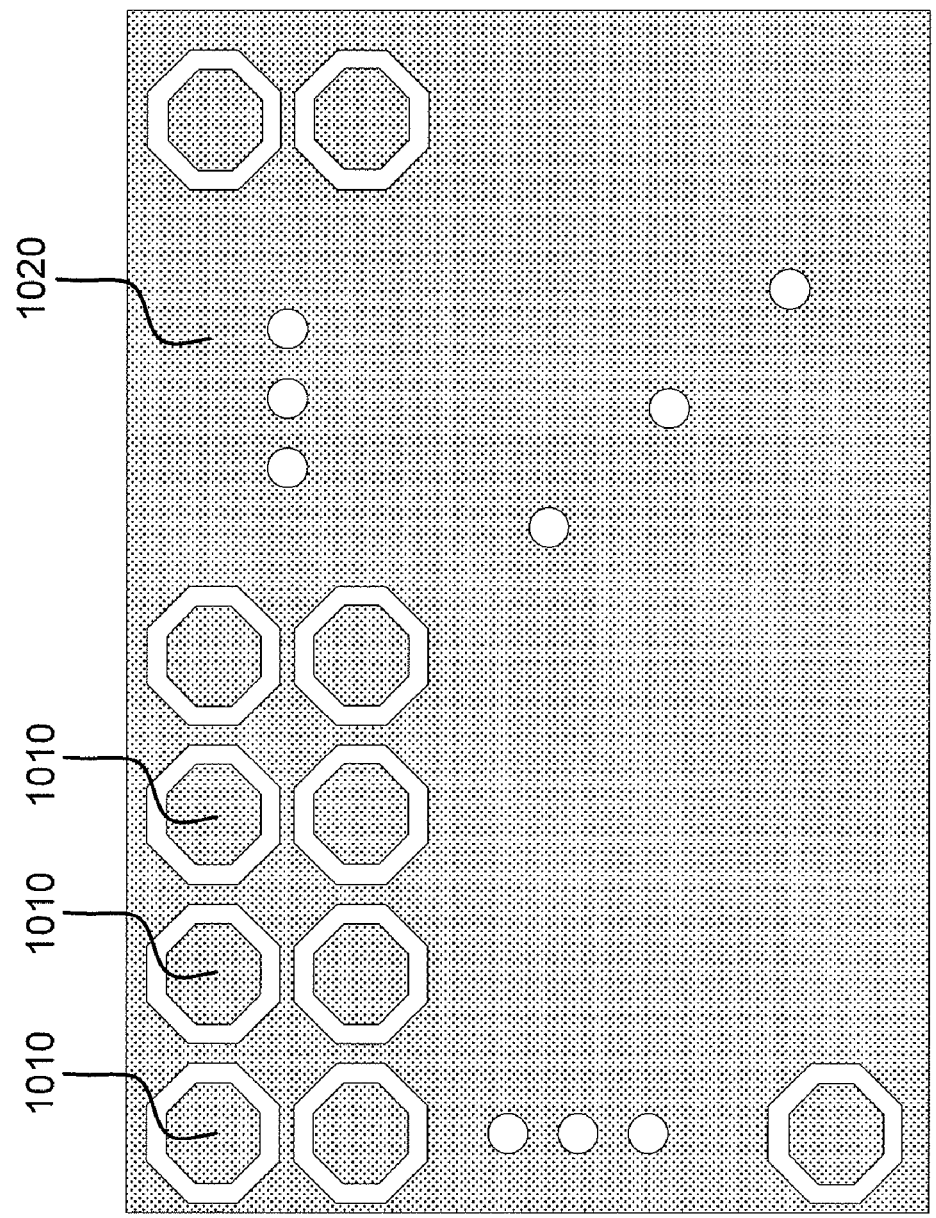
FIG. 10 shows a first circuit layout of a fingerprint sensing circuit of the claimed invention.
Figure 11:
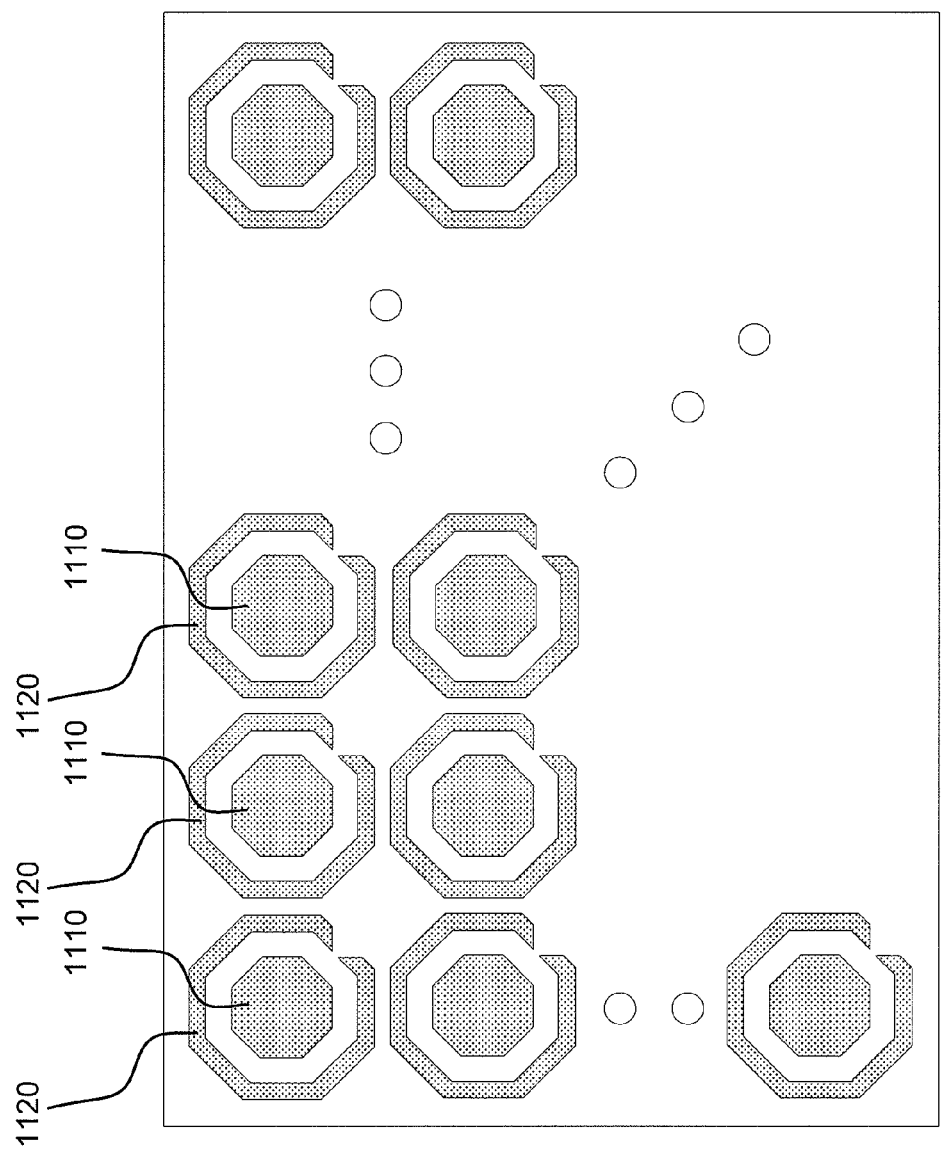
FIG. 11 shows a second circuit layout of a fingerprint sensing circuit of the claimed invention.
Figure 12:
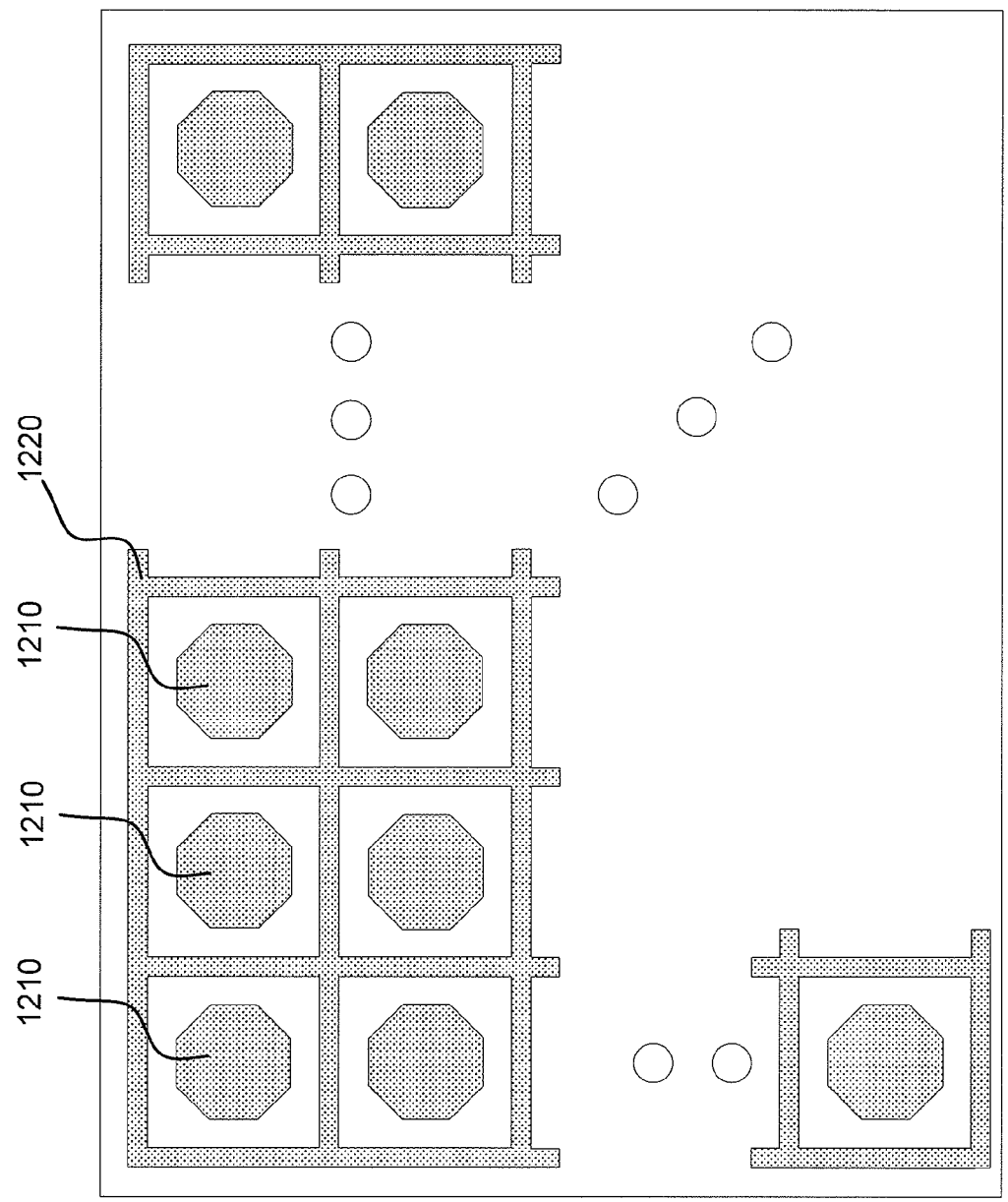
FIG. 12 shows a third circuit layout of a fingerprint sensing circuit of the claimed invention.

For the circuit layout, the structure of the sensing units can be embodied by the drawing shown in FIG. 10. For example, the shape of the sensing unit may be a circle or a polygon, and the sensing unit 1010 in FIG. 10 is exemplified by a regular octagon. All regions other than the sensing units 1010 are joined together to form a shield layer 1020, so as to avoid the possibility that the influence of a surrounding electric field on a local electric field of an individual sensing unit 1010 causes a poor sensing result. FIG. 11 and FIG. 12 also provide examples of circuit layouts. In FIG. 11, each sensing unit 1110 in a circle or polygon shape is surrounded by a shield layer 1120 with the same circle or polygon shape, and all shield layers 1120 are separated from each other. In FIG. 12, each sensing unit 1210 in a circle or polygon shape is surrounded by a rectangular shield layer 1220, and segments of the shield layers 1220 are joined together.

According to the present invention, the sensing unit is connected in series with a resistor, and forms a capacitor with an external electrode through the finger skin; therefore a low-pass or high-pass filter is formed and is utilized to filter the first signal by adjusting cut-off frequencies. After the peak value of the first signal is determined by the detecting circuit, a DC result is generated accordingly. Therefore, the whole fingerprint sensing circuit has better power efficiency and the sensing procedure is more accurate. In addition, the whole circuit is less influenced by the frequency of the signal source, and the AD converter does not process high frequency AC analog signals related to the signal source because the AD converter now processes DC analog signals. In summary, the fingerprint sensing circuit of the present invention can yield a more accurate sensing result, and the circuit configuration has advantages of simplicity, easy implementation, less power consumption, and low cost. Furthermore, the limitation on the frequency of the signal source is also relieved, and therefore the application scope is extended.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fingerprint sensing circuit for sensing a fingerprint of a user, comprising:
    a signal source, for providing a reference signal;
    an electrode, coupled to a reference level;
    at least a sensing unit, coupled to an output node, for generating at least a sensed value according to the electrode and the fingerprint of the user;
    a resistor, coupled between the signal source and the output node;
    a detecting circuit, coupled to the output node;
    wherein the resistor, the sensing unit, and the electrode constitute a filter circuit, at least a first signal is generated at the output node according to the reference signal and the sensed value, and the detecting circuit detects the first signal to generate a corresponded detected result which indicates the fingerprint of the user: and
    a comparator coupled to the detecting circuit, for comparing the detected result with a reference value to generate a corresponding indication signal;
    wherein a cut-off frequency of the filter circuit is moved towards a frequency of the reference signal by adjusting the resistance of the resistor until the detected result is equal to the reference value.

2. The fingerprint sensing circuit of claim 1, wherein the detecting circuit detects a peak value or an average energy value of the first signal to generate the detected result, and the detected result is a direct current signal.

3. The fingerprint sensing circuit of claim 1, further comprising:
    an analog-to-digital converter coupled to the detecting circuit, for converting the detected result into a digital signal.

4. The fingerprint sensing circuit of claim 3, wherein the resistor is a variable resistor and the analog-to-digital converter comprises:
    a counter coupled to the comparator and the variable resistor, for generating a digital signal according to the indication signal, wherein the resistance of the variable resistor is controlled by the digital signal.

5. The fingerprint sensing circuit of claim 1, wherein the fingerprint sensing circuit comprises more than one sensing unit, and the fingerprint sensing circuit further comprises:
    a multiplexer coupled to the sensing units, for selecting one of the sensing units.

6. The fingerprint sensing circuit of claim 1, wherein the filter circuit is a low-pass filter to the signal source.

7. A fingerprint sensing circuit for sensing a fingerprint of a user, comprising:
- a signal source, for providing a reference signal;
- an electrode, coupled to the signal source;
- at least a sensing unit, coupled to an output node, for generating at least a sensed value according to the electrode and the fingerprint of the user;
- a resistor, coupled between the output node and a reference level;
- a detecting circuit, coupled to the output node;
- wherein the resistor, the sensing unit, and the electrode constitute a filter circuit, at least a first signal is generated at the output node according to the reference signal and the sensed value, and the detecting circuit detects the first signal to generate a corresponded detected result which indicates the fingerprint of the user; and
- a comparator coupled to the detecting circuit, for comparing the detected result with a reference value to generate a corresponding indication signal;
- wherein a cut-off frequency of the filter circuit is moved towards a frequency of the reference signal by adjusting the resistance of the resistor until the detected result is equal to the reference value.

8. The fingerprint sensing circuit of claim 7, wherein the detecting circuit detects a peak value or an average energy value of the first signal to generate the detected result, and the detected result is a direct current signal.

9. The fingerprint sensing circuit of claim 7, further comprising:
- an analog-to-digital converter coupled to the detecting circuit, for converting the detected result into a digital signal.

10. The fingerprint sensing circuit of claim 9, wherein the resistor is a variable resistor and the analog-to-digital converter comprises:
- a counter coupled to the comparator and the variable resistor, for generating the digital signal according to the indication signal, wherein the resistance of the variable resistor is controlled by the digital signal.

11. The fingerprint sensing circuit of claim 7, wherein the fingerprint sensing circuit comprises more than one sensing unit and the fingerprint sensing circuit further comprises:
- a multiplexer coupled to the sensing units, for selecting one of the sensing units.

12. The fingerprint sensing circuit of claim 7, wherein the filter circuit is a high-pass filter to the signal source.

* * * * *